Nov. 10, 1936. H. L. SCHLOSSER 2,060,638
SERVICE STATION STEAMER
Filed March 5, 1934 2 Sheets-Sheet 1
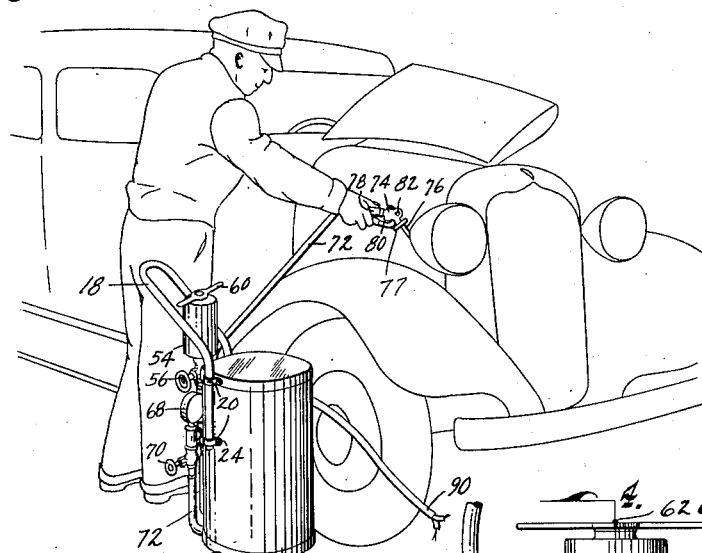
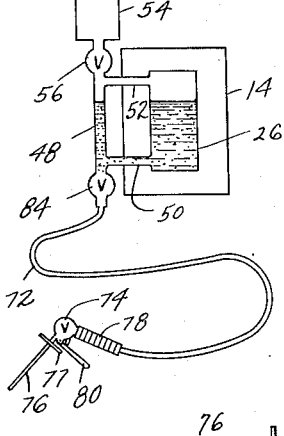
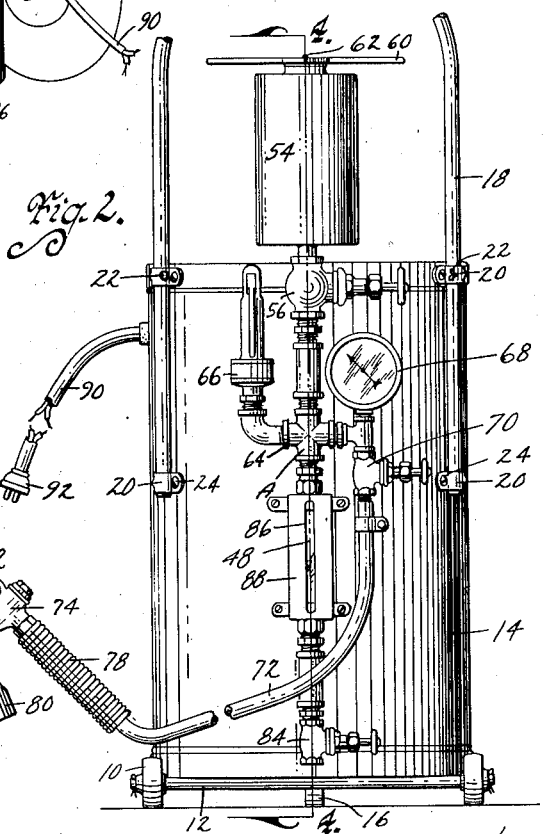
Inventor:— Harold L. Schlosser
by Bair, Freeman & Sinclair
Attorneys
Witness
Edw. Leeby Nov. 10, 1936.  H. L. SCHLOSSER  2,060,638
SERVICE STATION STEAMER
Filed March 5, 1934  2 Sheets-Sheet 2
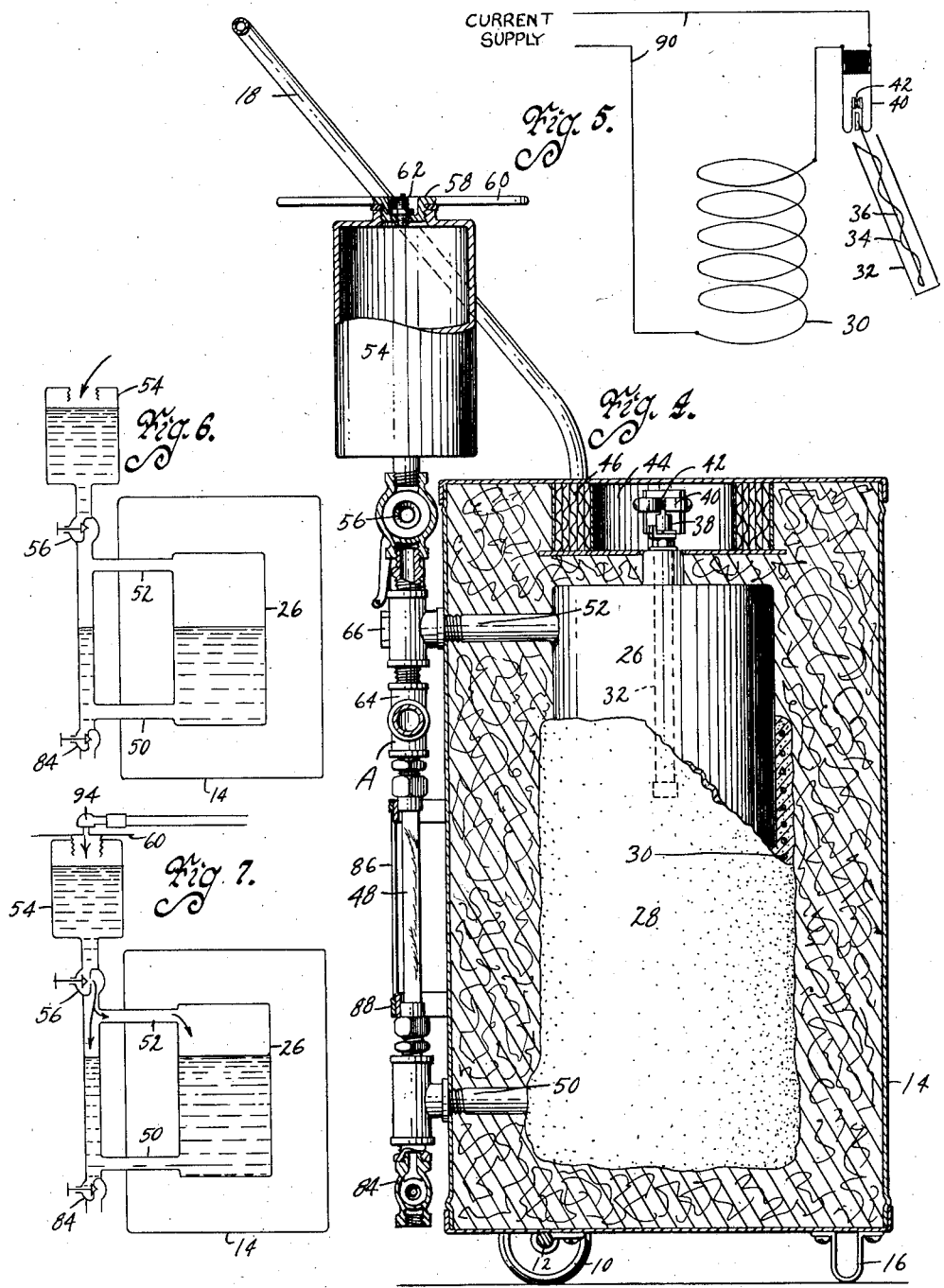

Patented Nov. 10, 1936

2,060,638

UNITED STATES PATENT OFFICE 2,060,638

SERVICE STATION STEAMER

Harold L. Schlosser, Defiance, Ohio, assignor to Lectrolite Corporation, Defiance, Ohio, a corporation of Ohio Application March 5, 1934, Serial No. 714,058

7 Claims. (Cl. 219—38)

The object of my invention is to provide a service station steamer which is simple, durable and comparatively inexpensive to manufacture.

More particularly, it is my object to provide a simple and convenient steam generator which is readily portable so that it can be wheeled from one position to another in or about a service station and which is especially adapted for thawing out frozen radiators, carbureters, oil pumps and pans as well as frozen shackles.

It is also adapted for cleaning grease off of parts of an automobile such as the differential and transmission housings and for flushing out these housings so as to eliminate all the old grease therefrom before refilling with new grease. It has many other applications about a service station and is made so that it can be plugged in wherever there is an electrical outlet so that it can be operated conveniently at any location about the service station.

A further object is to provide a service station steamer comprising a wheel mounted boiler having a transporting handle and having a flexible steam hose extending from the boiler and terminating in a control valve which can be readily opened when it is desired to use steam for any purpose, the control valve having interchangeable nozzles, one of which is of sufficient length to get at out of the way places about the automobile.

Still a further object is to provide a steamer which is automatic in its operation, it being operated by an electric heating element which is controlled by an automatic switch responsive to the temperature of the boiler so that excess pressure is not generated, the boiler being provided with a pop valve for safety in the case of an accidental excess pressure being generated.

A further object is to provide a novel means for filling the boiler with water while steam is contained in it without having to exhaust the steam.

A further object is to provide a steamer which can dispense either steam or hot water, the hot water having a cleaner in it if desirable.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of my service station steamer being used by a service station attendant on the motor of an automobile.

Figure 2 is a rear elevation of the steamer.

Figure 3 is an enlarged view of a nozzle which can be interchanged with the one shown in Figure 2.

Figure 4 is an enlarged sectional view on the line 4—4 of Figure 2.

Figure 5 is an electrical diagrammatic view of the heating element and its automatic control switch.

Figure 6 is a diagrammatic view showing the filler tank of the steamer being filled.

Figure 7 is a similar diagrammatic view showing the water from the filler tank being forced into the boiler; and Figure 8 is a diagrammatic view showing the dispensing hose of Figure 2 attached for dispensing hot water instead of steam.

I have used the reference numeral 10 to indicate supporting wheels. They are mounted on a shaft 12 which is secured to a casing 14. The casing has a single leg 16 whereby the two wheels 10 and the leg 16 normally serve as a three point support for the casing.

The casing is provided with an inverted U-shaped handle 18 secured to the casing by U clips 20 and cotter pins 22. The clips 20 are mounted by means of screws 24 whereby they may be tightened against the handle 18 while the cotter pins 22 prevent longitudinal movement of the handle relative to the clips.

Within the casing 14 I provide a boiler 26 of somewhat smaller dimensions than the casing. Insulating material 28 and a heating element 30 surround the major portion of the boiler 26.

Extending into the upper end of the boiler 26 is a tube 32. It contains a bimetal coil 34 secured at its upper end to the tube and at its lower end secured to a rod 36. The rod 36 has a cam 38 on its upper end. The cam 38 is located between a pair of normally closed spring switch arms 40 having contacts 42. When the cam, which is blade-shaped between the spring arms 40, rotates sufficiently far from its normal position to separate the contacts 42, the current to the heating element 30 is broken.

The circuit is shown in Figure 5, it being obvious that the heating element is merely connected in series with the contacts. This constitutes an automatic switch structure, the details of which are not herein elaborated upon as they form the subject matter of Patent No. 1,932,071 issued to Lee W. Hodges on October 24, 1933.

The switch mechanism is mounted within a compartment 44 in the casing 14 formed by strips of insulation shown in cross section and corrugated insulating material at 46.

A water column A is provided exterior of the casing 14 and includes a water gauge glass 48 connected by nipples 50 and 52 with the bottom and top respectively of the boiler 26. At the top of the water column, I provide a filler tank 54 communicating therewith, a filler valve 56 being interposed between the filler tank and the water column. An air tight removable cap 58 is provided for the filler tank 54 and has handles 60 whereby to give leverage during the tightening down of the cap. The cap is provided with a charging check valve 62 similar to an ordinary pneumatic tire valve.

Between the nipple 52 and the gauge glass 48 I provide a cross fitting 64 having a pop valve 66 connected therewith on one side and a pressure gauge 68 and supply valve 70 on the other side.

Connected with the supply valve is one end of a flexible steam hose 72. On its other end is mounted a control valve 74 having a nozzle 76, a handle 78 and a trigger 80. An eye 82 is provided on the control valve 74 for hanging it in any convenient position. In Figure 3, I illustrate on an enlarged scale a nozzle 76a which can be substituted for the nozzle 76 if desired, the one being merely screwed out of the control valve 74 and the other screwed into it. At the bottom of the water column I provide a blow off and cleaner valve 84.

*Practical Operation*

In the operation of my service station steamer, the boiler 26 may be filled by removing the cap 58 on the filler tank 54, opening the filler valve 56 and pouring water into the filler tank. The water will run by gravity into the boiler 26. Its flow can be augmented by opening the supply valve 70 and the control valve 74. When enough water has been introduced to bring the level up to about a half inch below the upper end of a slot 86 formed in a guard shield 88, sufficient water has been added for proper operation. The filler valve 56 may then be closed and supply wires 90 connected with a source of current supply, an ordinary outlet plug 92 being provided for this purpose.

The water will then become heated and finally steam will be generated and when the steam reaches about sixty pounds pressure, the thermostatic switch will cut off the current supply. The steam will then keep rising until the pressure reaches about seventy-five pounds, this having been determined by actual use of the device. The pressure will register on the pressure gauge 68 and if it should reach about ninety pounds pressure, the pop valve 66 will open as a safety measure.

In the use of the device, the nozzle 76 should first be pointed toward a drain or the like and the control valve 74 opened until condensed steam in the hose 72 and the control valve is all eliminated and only steam flows from the nozzle. The steamer is then ready for use. It can be used for thawing out a frozen radiator for instance by playing the steam over the surface of the radiator, and other parts of the automobile may be similarly thawed out.

For removing grease, the heat of the steam first loosens the grease and the force of the steam drives it off the parts being cleaned. This heats the parts to such an extent that any tendency for condensation to collect is overcome by the heat of the part immediately evaporating any moisture.

In flushing differential and transmission cases, all of the old grease is melted so that it will readily drain out and the housings become so heated that there is no danger of condensation being left in them as it is all evaporated due to the heat. Thus all the old grease can be cleaned out of the housings and the entire replenished supply is of new grease only.

While there is a head of steam in the boiler, it can be refilled with water by first making sure the filler valve 56 is closed and then removing the cap 58 from the filler tank 54 and filling the tank with water as shown in Figure 6. The cap is then replaced and securely turned down against its gasket whereafter the valve 56 can be opened for the water to flow into the boiler. An air chuck, such as indicated at 94 in Figure 7, is then pressed against the charging valve 62 so as to force the water through the valve 56 against the boiler pressure which is less than the air pressure ordinarily carried in service stations. The valve 56 is then closed after the water has been forced into the boiler whereafter the air chuck is removed.

Occasionally it is desirable to blow out the boiler to remove sediment and scale and this is done by first generating a full head of steam and disconnecting the plug 92 from the current supply and opening the blow off valve 84 wide open.

After the boiler is exhausted, it is filled with water and again connected with the source of current supply. When either filling or refilling the boiler with water, warm or hot water is preferable, although not essential as this shortens the generating period.

My invention can be made in any desired size and can be used for any purpose where it is desirable to use steam. For instance, a small size steamer can be provided for cleaning beer coils or the like.

The valve 84 can function either as a blow off valve as already described, or as a cleaner valve by connecting the hose 72 therewith as in Figure 8. When the valve 84 is then opened, hot water will flow from it and can be used for any purpose where hot water under pressure is needed.

Arranged as in Figure 8, the apparatus functions efficiently as a motor cleaner for automobiles and the like. A metal cleaner is mixed with the water, the cleaner being indicated by stippling in Figure 8. When the control valve 74 is opened, the steam pressure forces the hot water out through the nozzle 76 and due to the high temperature of the water, it expands as soon as it strikes the atmosphere at the discharge end of the nozzle, whereupon it turns into steam vapor loaded with the metal cleaner and causes the metal cleaner to impinge against the motor or other article being cleaned.

The metal cleaner in conjunction with the steam and hot water quickly cleans all accumulations of grease and dirt from the surface of the motor.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. In a steam producing device, a boiler, an electric heating element surrounding said boiler for applying heat over a considerable area of the outside of said boiler, a flexible steam hose extending from said boiler, a manual control valve on the outer end of said steam hose for controlling the flow of steam from the boiler and means for permitting the filling of said boiler with water while it contains steam, said means comprising a filler tank having valved communication with said boiler, a filler plug for said tank and a charging check valve connected with said tank and adapted for connection with an air chuck.

2. In a portable steamer of the class described, a boiler, a pair of wheels thereon adjacent one side thereof and a supporting leg thereon adjacent the other side thereof cooperating to normally support said boiler, a handle on said boiler and projecting from the first mentioned side thereof for tipping said boiler to thereby raise said leg and for thereafter wheeling said boiler from one place to another, an electric heating element for said boiler, a steam discharge conduit extending from said boiler, a manual control valve on the outer end of said conduit for controlling the flow of steam from said boiler, and thermostatic means for controlling said heating element in accordance with the interior temperature of said boiler.

3. In a steamer, a boiler, an electric heating element for said boiler, a flexible steam hose extending from said boiler, a control valve on the outer end of said steam hose and means for filling said boiler with water while it contains steam comprising a filler tank, an air tight removable cap therefor, a conduit from said tank to said boiler, a filler valve in said conduit and a charging check valve on said filler tank adapted for connection with an air chuck.

4. In a steam generator, a portable boiler, a pair of wheels thereon adjacent one side thereof, a supporting leg thereon adjacent the other side thereof, said wheels and leg, in conjunction, normally supporting said boiler, a transporting handle on said boiler extending from the side adjacent which said wheels are mounted for tipping said boiler so that said leg is raised and said boiler may then be wheeled by said handle, an electric heating element for said boiler, a casing surrounding said boiler and spaced therefrom, insulating material interposed between said boiler and said casing, a steam conduit extending from said boiler, and a manual control valve on the outer end of said steam conduit.

5. In a service station steamer, a boiler, a pair of wheels on the bottom thereof adjacent one side thereof, a supporting leg on said bottom adjacent the opposite side thereof, a transporting handle extending from said first mentioned side of said boiler, an electric heating element for said boiler, a flexible hose extending from said boiler, a control valve on the outer end of said hose, said hose being selectively connectible with the top or bottom of said boiler to receive either steam or hot water as desired and thermostatic means responsive to the temperature within said boiler for controlling the flow of current to said heating element.

6. In a device of the class described, a boiler, means for heating water in said boiler to generate steam, a flexible steam hose extending from said boiler, a control valve for the outer end of said steam hose, said device being readily portable for convenience in moving it from one position to another within a service station or the like, a filler tank for said boiler, a filler valve between said filler tank and said boiler and a charging valve for said filler tank adapted to coact with and receive compressed air from a compressed air chuck.

7. In a steam producing device, a boiler, means for heating said boiler, a flexible steam hose extending from said boiler, and means for permitting the filling of said boiler with water while it contains steam, said means comprising a filler tank having valved communication with said boiler, a filler plug for said tank, and a charging check valve connected with said tank and adapted for connection with an air chuck.

HAROLD L. SCHLOSSER.